Jan. 11, 1927. Re. 16,531

C. D. MOSHER

AIR HEATING APPARATUS

Original Filed August 14, 1923 3 Sheets-Sheet 1

INVENTOR
C. D. Mosher
by Wright Brown Quinby & May
ATTORNEYS

Jan. 11, 1927. C. D. MOSHER Re. 16,531
AIR HEATING APPARATUS
Original Filed August 14, 1923 3 Sheets-Sheet 2
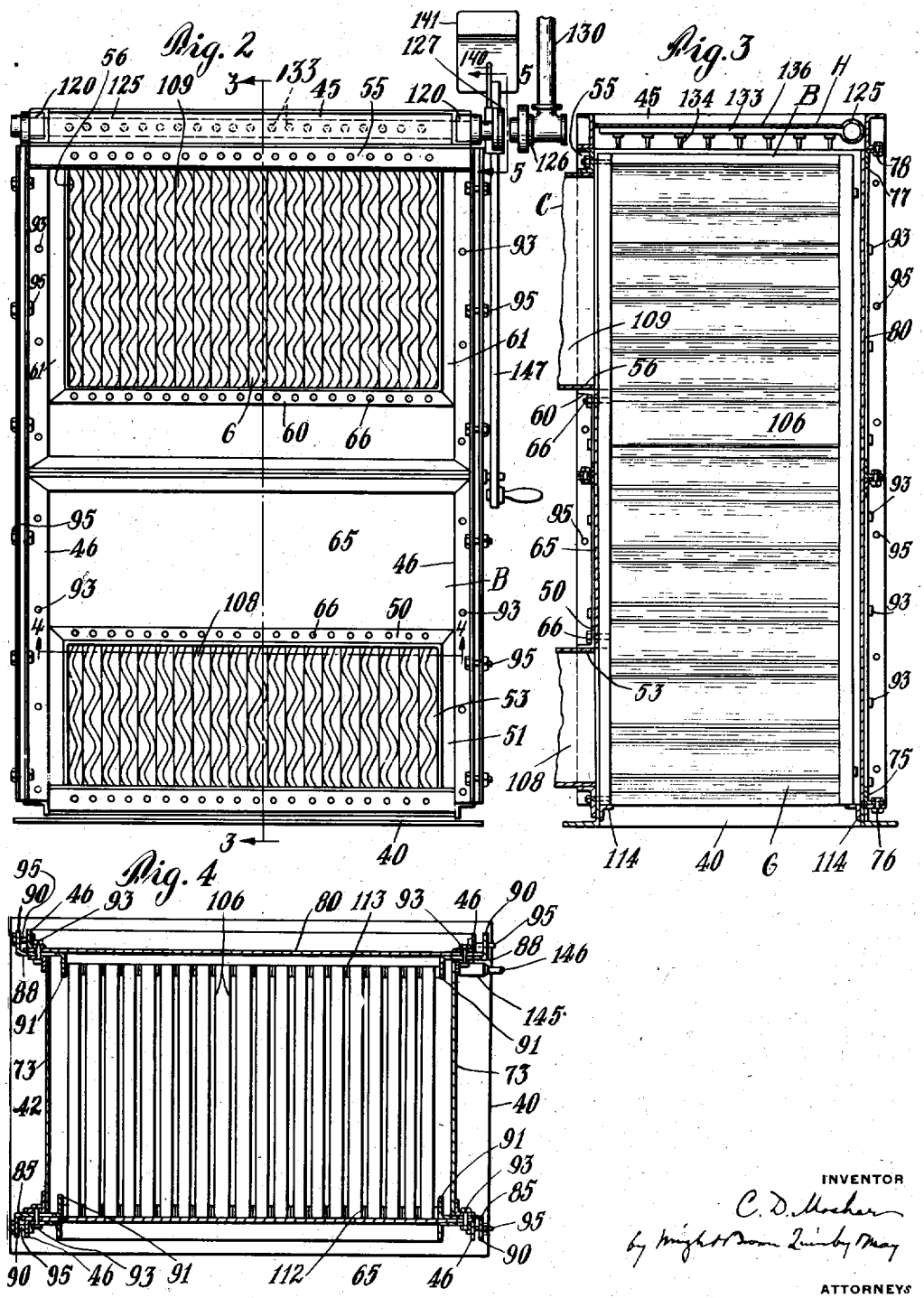
INVENTOR
C. D. Mosher
by Wright Brown Quinby & May
ATTORNEYS Jan. 11, 1927. C. D. MOSHER Re. 16,531
AIR HEATING APPARATUS
Original Filed August 14, 1923 3 Sheets-Sheet 3
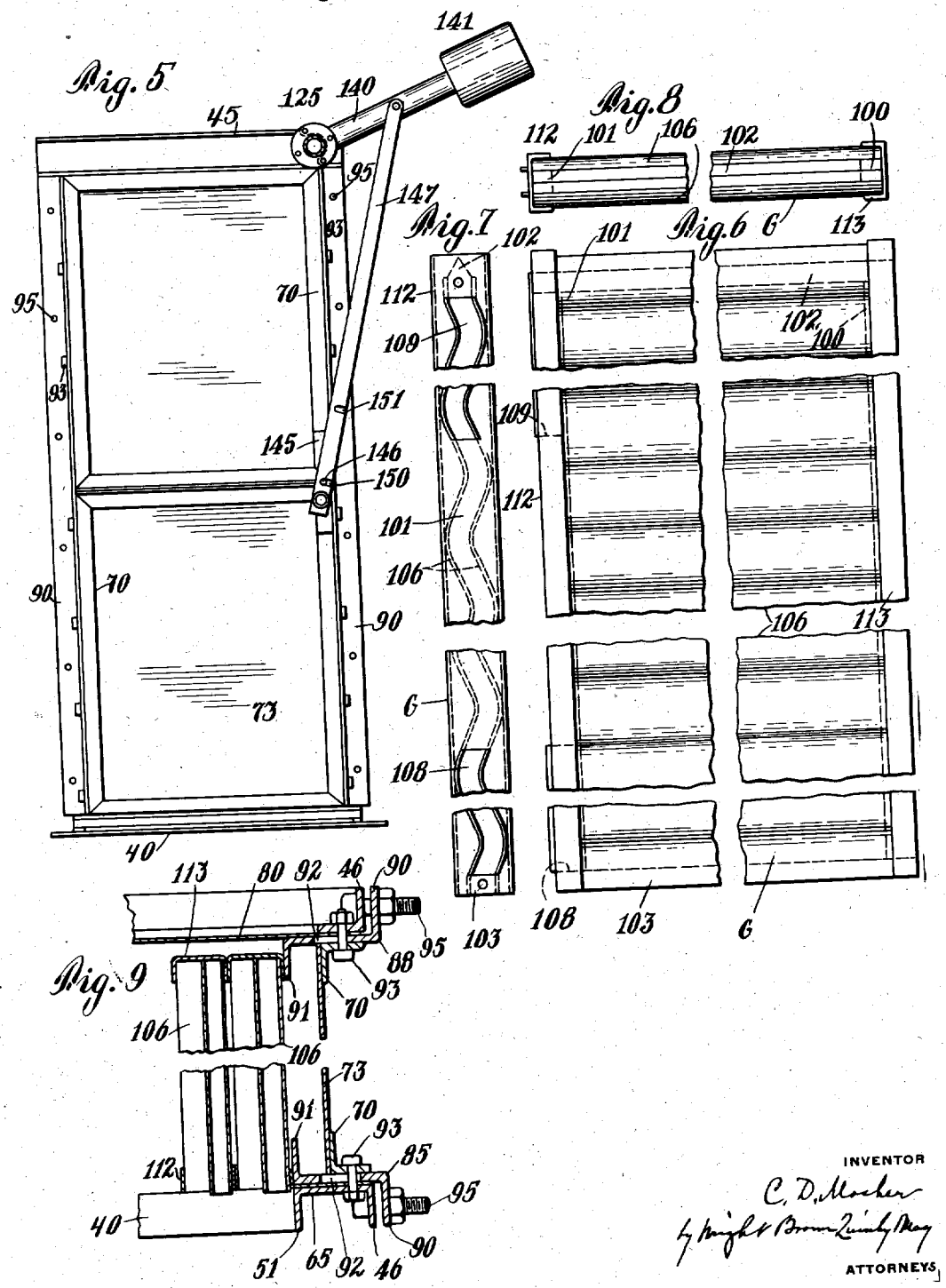
INVENTOR
C. D. Mosher
by Wright Brown Quinby & May
ATTORNEYS Reissued Jan. 11, 1927. Re. 16,531

UNITED STATES PATENT OFFICE.

CHARLES D. MOSHER, OF HYDE PARK, MASSACHUSETTS.

AIR-HEATING APPARATUS.

Original No. 1,558,493, dated October 27, 1925, Serial No. 657,303, filed August 14, 1923. Application for reissue filed May 29, 1926. Serial No. 112,674.

The object of this invention is the production of an air-heating apparatus and is an improvement of my invention for a similar apparatus described in my Letters Patent No. 1,364,135, bearing date January 4, 1921.

The invention is founded on the principle of the transfer of heat, from the outgoing hot gases and products of combustion from the fuel of a furnace to the incoming air for the combustion of said fuel.

To obtain the best results, an air heater is made up of removable air chambers with corrugated surfaces, that provide sinuous passages for air and gases that flow through the heater in opposite directions.

It is well known that a gas or air will flow along a straight or plane surface and closely adhere thereto, by virtue of which only a thin stratum of the air or gas is heated from any heat emanating from the plane surface, the said stratum forming an insulator of heat and permitting but little heat to be transmitted to the other strata of the mass of air. By means of corrugated plates, as employed in this apparatus, a zigzag flow of hot gases is obtained on one side of the plates and a zigzag counter flow of air on the opposite sides of the plates.

The plates are contained in an air heater, in which hot gases flow in one direction on one side of the plates, and the air to be heated flows in the opposite direction on the opposite side of the plates.

The corrugated surfaces of the plates provide zigzag or sinuous passages which cause the air and hot gases to constantly change their direction of flow at each impingement on the surfaces of the plates. Both the air and hot gases as they leave the surface of one corrugation impinge against the surface of the next corrugation in a direction making an angle from its previous direction of flow.

By this means stratification is broken up and the amount of heat transferred from the hot gases to the air is greatly increased per unit of surface.

The organization of the invention shown by the drawings comprises an air heater with a casing enclosing detachable air chambers or units adjacent to each other in a row and having corrugated side walls. Air flows through the chambers on its way to the fuel of a furnace, and hot gases and products of combustion from the fuel flow through the heater between the outer faces of the chambers in an opposite direction. Heat is thereby transmitted from the hot gases to the air through the walls of the air chambers.

In the accompanying drawings,—

Figure 2 shows an enlarged front elevation of an air heater.

Figure 1:
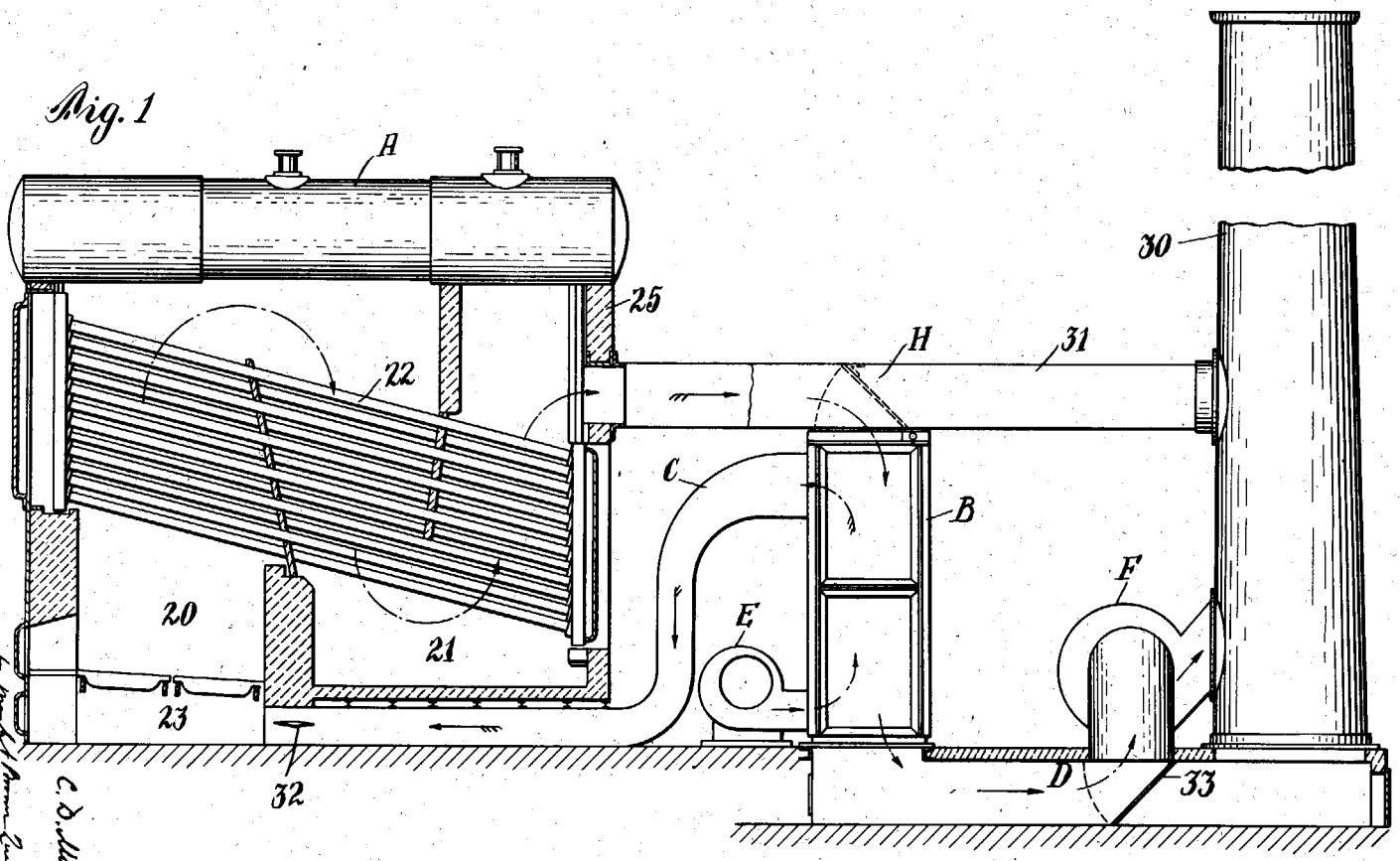
Figure 1 represents a slide elevation of the air-heating apparatus connected to a steam generating plant shown partly in section.

Figure 3 indicates a partal section of Figure 2, on the line 3—3.

Figure 4 represents a partial section of Figure 2, on the line 4—4.

Figure 5 shows a right hand side view and section on the line 5—5 of Figure 2.

Figure 6 represents a fragmentary enlarged side elevation of a detachable chamber or unit.

Figure 7 shows a left hand side view of Figure 6.

Figure 8 is a top plan view of Figure 6, and

Figure 9 indicates an enlarged fragmentary portion of Figure 4.

Referring to Figure 1, a partial longitudinal section of a steam generator is indicated in its entirety by the letter A, with the furnace 20, combustion chamber 21, tubes 22, ash pit 23, and the rear wall 25. A smoke stack 30 is connected to an opening in the wall 25, by means of the gas conduit 31.

The air heater is indicated in its entirety by the letter B, and its upper end is connected to the conduit 31.

An air duct C having a damper 32 connects the upper portion of the air heater B and the ash pit 23.

A gas conduit D with the damper 33 connects the gas outlet of the air heater B and the lower end of the smoke stack 30. A blower E is connected to the lower portion of the air heater B.

A fan F for induced draft is interposed between the conduit D and the smoke stack 30.

The air heater B comprises a casing with the foundation frame 40 and the top frame 45, which are connected by the angle-iron uprights 46. The casing has connected thereto the angle irons 50 and 51 which, with the frame 40, provide an opening 53 and means for connecting the blower E to the heater B. A channel iron 55 is connected to the frame 45. Angle irons 60 and 61 are connected to the casing of the heater B and which, with the channel iron 55, form an opening 56 and constitute means for connecting the air duct C to the air heater. A plate 65 is connected to the angle irons 50 and 60, by means of the studs 66. Vertical angle irons 70 in the heater B have connected thereto the side plates 73. An angle iron 75 is bolted to the frame 40 by means of the bolts 76 and an angle iron 77 is bolted to the frame 45 by means of the bolts 78. A plate 80 is secured to the angle irons 75 and 77.

Z bars 85 (Figure 4) are positioned with their webs bearing against the plate 65, and similar Z bars 88 are positioned with their webs bearing against the plate 80. Each of the Z bars is indicated with the flanges 90 and 91, and has formed in its web elongated openings 92. Clamping bolts 93 extend through said openings and also through the angle irons 46 and 70, and respectively through the plates 65 and 80. Clamping bolts 95 connect the angle irons 46 and the flanges 90 of the Z bars.

In the air heater B are detachably secured a row of air chambers or units, each designated in its entirety by the letter G.

Each chamber G comprises a vertical rear serpentine spacer bar 100, extending the full length of the air chamber, and a vertical front serpentine spacer bar 101, with its ends spaced from the top and bottom of the air chamber. A straight spacer bar 102 connects the top ends of the bars 100 and 101, and a straight spacer bar 103 connects their lower ends. To the sides of the spacer bars are secured the corrugated plates 106, which constitute the side walls of the air chambers. Between the lower end of the bar 101 and the bar 103, is formed the opening 108, and between the top end of the bar 101 and the bar 102, is formed the opening 109. To the outer faces of the plates 106 are secured the channel irons 112 and 113. Openings are formed in the channel irons 112 which register with the openings 108 and 109. The chambers G are supported upon the angle irons 114 of the frame 40. The studs 66 engage the bar 101.

In the top frame 45 are secured journal brackets 120, for a combined damper and soot blower designated in its entirety by the letter H. The combined damper and soot blower comprises the main pipe 125, closed at one end and connected to the swivel coupling 126 at its other end, by means of the pipe flanges 127. The coupling 126 has connected thereto the pipe 130 for steam. A plurality of branch pipes 133, closed at their outer ends, extend from the pipe 125 and have extending therefrom the outlet nozzles 134, by means of which jets of steam or other cleaning fluid can be directed between the outer faces of the air chambers G for the purpose of cleaning them of soot or other foreign matter. A plate 136 is secured to the branch pipes 133 and forms a damper for the gas conduit 31 and the air heater B. To one of the pipe flanges 127 is fastened the counterweight arm 140 with the counter weight 141 adjustably connected thereto.

A bracket 145 having the lock pin 146, extends from one of the sides of the air heater B. A control rod 147 has its upper end pinned to the arm 140, and in its lower end are formed notches 150 and 151, by means of which the rod can be locked in different positions to the lock pin 146, to locate the combined damper and soot blower H in different positions.

The operation of the invention is apparent from the foregoing description and drawings, and may be stated as follows:

When getting up steam in the furnace 20, the soot blower and damper H is swung down to close off the air heater B, to allow the products of combustion from the steam generator A to pass through the conduit 31, directly to the stack 30. When the steam generator is operating normally the soot blower and damper H is swung up, as indicated in dotted lines in Figure 1. The blower E is started and air is forced through the air chambers G by entering the openings 108 and flowing therefrom through the openings 109. The air then flows into the duct C and is directed to the ash pit 23, for the fuel in the furnace 20.

While the air is flowing up through the chambers G, the hot gases and products of combustion from the furnace 20 flow down through the air heater B, through the corrugated passages between the air chambers, and transmit heat to the air flowing through the chambers.

If the stack 30 is of considerable height sufficient draft will be realized so that the damper 33 may be swung to its horizontal position, and the products of combustion which are discharged from the air heater B to the conduit D will pass directly to the base of the stack. In case of a low stack furnishing insufficient draft, the induced draft fan F will draw the gases up through the fan and then force them through the stack 30, after having first swung the damper 33 down, to close off passage of the gases to the bottom of said stack.

If the spaces between the air chambers G are to be cleaned, the soot blower and damper H is swung down to a horizontal position, and steam supplied by the pipe 130 is discharged from the nozzles 134 and directed to the passages between the outer faces of the corrugated plates 106 of the air chambers G.

The air chambers G are tightly clamped in a row in the air heater B, by means of the Z bars 85 and 88, the flanges 91 of the Z bars bearing against the channel irons 112 and 113 of the air chambers at the ends of the row thereof. The Z bars are clamped in place by means of the bolts 93. Any of the air chambers G can easily be removed from the casing of the air heater B, by releasing the nuts from the studs 66, the nuts of the front members of the frames 40 and 45 and removing the plate 80, after disengaging the bolts 76 and 78, respectively, from the frames 40 and 45.

An important feature of my present invention consists in the construction and mounting of the row of air chambers or units G which, as hereinbefore described, are detachably mounted in, and independently removable from, the casing B, with narrow passages for a heating agent between them, so that one or more, or all of the air chambers G can be removed, either for repairs or to enable a new chamber to be substituted for an old one, or to enable any or all of said chambers to be reversed, or turned upside down.

Various modifications may be made in the invention, within the spirit of the claims, and the present exemplification is to be taken as illustrative and not limitative thereof.

I claim:

1. In an air heater the combination of a casing, a pair of adjustable bars at each of the sides of the casing, a plurality of air chambers arranged in a row in the casing with the ends of said row bearing against the pairs of bars, corrugated walls for each of the chambers, each of said chambers having an opening at its upper end and an opening at its lower end and means to clamp the adjustable bars to the casing and to bear against said chambers at the ends of the row to clamp the chambers in place in spaced position.

2. In an air heater the combination of a casing, a pair of adjustable bars at each of the sides of the casing, a plurality of air chambers arranged in a row in the casing, corrugated walls for each chamber, an element encasing the front and rear portion of each chamber, each front element having a pair of openings, movable bars at the sides of the casing, and means to clamp the bars to the casing, and to bear against said chambers at the ends of the row to clamp them in place with said elements bearing against each other.

3. In an air heater the combination of a casing, a pair of adjustable bars at each of the sides of the casing, a plurality of air chambers arranged in a row in the casing, corrugated side walls spaced apart for each chamber, channel irons encasing the front and rear portion of each chamber, one of said channel irons having a pair of openings leading into its chamber, movable bars at the sides of the casing and means to clamp the bars to the casing and to bear against said channel irons at the ends of said row to clamp the chambers in place with passages between them.

4. In an air heater the combination of a casing, a plurality of air chambers detachably located in a row in the casing, corrugated side walls spaced apart for each chamber, channel irons encasing the front and rear portion of each chamber, one of the channel irons of each chamber having a pair of openings leading to its interior, the adjoining faces of said channel irons of adjacent chambers normally bearing against each other, adjustable Z bars at the sides of the casing with one of the flanges of each normally bearing against the channel irons of the air chambers of the ends of the row, angle irons at the sides and corners of the casing with one of the flanges of each adjacent to the other flanges of the Z bars, and clamping bolts connecting the latter flanges of the Z bars and the adjacent flanges of the angle irons at the corners of the casing.

5. An air heater of the class described, comprising a casing, a plurality of independently removable air chambers in said casing, channel irons holding the air chambers in spaced relationship, said channel irons having openings communicating with the air chambers near opposed ends thereof, means for clamping the edges of the channel irons together, and means for connecting the channel irons with air ducts, to enable air to be conducted through said air chambers.

6. In an air heater of the class described, a casing, a plurality of air chambers detachably secured within said casing in a manner so that one or all of said chambers may be removed or reversed upside down, and means for clamping said chambers together in spaced position.

7. In an air heater, a casing, a plurality of removable closed air chambers enclosed in said casing, openings being provided into the air chambers connecting with air ducts near their ends, the air chambers being spaced apart by channel irons of greater width than the chambers for the passage of hot gases between the chambers, means for clamping the edges of the channel irons together by bars adjustably attached to the angles forming part of the casing, and means for tying the adjustable bars to the edges of the chambers and casing.

8. In an air heater of the class described, a casing, a plurality of detachable air chambers, spaced apart for the passage of hot gases between them, enclosed in and secured to said casing, the air chambers having openings through channel bars in their edges, for air to enter and leave, near their upper and lower ends, the top, bottom and back edges of said chambers being closed, also the edges adjoining or between the air-inlet and air-outlet openings, the air chambers having means at each end of the air-inlet and air-outlet openings for securing them to air ducts to enable air to enter or leave the air chambers.

In testimony whereof, I have affixed my signature.

CHARLES D. MOSHER.